US009059471B2

(12) United States Patent
Ozaki et al.

(10) Patent No.: US 9,059,471 B2
(45) Date of Patent: Jun. 16, 2015

(54) CARBON CATALYST, METHOD FOR MANUFACTURING THE CARBON CATALYST, AND ELECTRODE AND BATTERY USING THE CARBON CATALYST

(75) Inventors: Jun-ichi Ozaki, Kiryu (JP); Yuka Koshigoe, Hitachi (JP); Takeaki Kishimoto, Funabashi (JP)

(73) Assignee: NISSHINBO HOLDINGS INC., Tokyo (JP)

( * ) Notice: Subject to any disclaimer, the term of this patent is extended or adjusted under 35 U.S.C. 154(b) by 285 days.

(21) Appl. No.: 13/131,997

(22) PCT Filed: Nov. 24, 2009

(86) PCT No.: PCT/JP2009/069777
§ 371 (c)(1),
(2), (4) Date: May 31, 2011

(87) PCT Pub. No.: WO2010/064555
PCT Pub. Date: Jun. 10, 2010

(65) Prior Publication Data
US 2011/0243830 A1  Oct. 6, 2011

(30) Foreign Application Priority Data

Dec. 2, 2008 (JP) .................. 2008-307847

(51) Int. Cl.
*C01B 31/02* (2006.01)
*H01M 4/96* (2006.01)
*H01M 4/86* (2006.01)
*H01M 8/10* (2006.01)

(52) U.S. Cl.
CPC ................. *H01M 4/96* (2013.01); *C01B 31/02* (2013.01); *C01P 2002/60* (2013.01); *H01M 4/8605* (2013.01); *H01M 2008/1095* (2013.01); *Y02E 60/50* (2013.01)

(58) Field of Classification Search
USPC .................. 252/503; 429/231.8; 502/182
See application file for complete search history.

(56) References Cited

U.S. PATENT DOCUMENTS

| 5,888,430 A | * | 3/1999 | Wakayama et al. ........... 252/503 |
| 5,919,429 A | * | 7/1999 | Tanaka et al. ............. 423/445 B |
| 6,509,119 B1 | * | 1/2003 | Kobayashi et al. ........ 429/231.8 |
| 7,320,842 B2 | | 1/2008 | Ozaki et al. |
| 7,585,585 B2 | | 9/2009 | Ozaki et al. |
| 2003/0175580 A1 | | 9/2003 | Ozaki et al. |
| 2005/0037255 A1 | | 2/2005 | Ozaki et al. |

FOREIGN PATENT DOCUMENTS

| JP | A-2007-18801 | 1/2007 |
| JP | A-2007-26746 | 2/2007 |
| JP | A-2007-207662 | 8/2007 |
| JP | A-2008-282725 | 11/2008 |

OTHER PUBLICATIONS

Kobayashi et al., "Influences of Surface State of Carbon Substrates on the Catalytic Activity of Carbon Catalyst for ORR Prepared by Poly-Vinylpyridine Metal Complexes for Oxygen Reduction Reaction (ORR)." *The Carbon Society of Japan*, 2008, vol. 35, p. 124-125.
International Search Report dated Feb. 16, 2010 in International Application No. PCT/JP2009/069777 (with translation).

* cited by examiner

*Primary Examiner* — Stuart Hendrickson
(74) *Attorney, Agent, or Firm* — Oliff PLC

(57) ABSTRACT

A method of manufacturing a carbon catalyst according to the present invention includes: a first step involving heating a raw material containing a resin and a metal to carbonize the resin so that a carbon catalyst is obtained; a second step involving subjecting the carbon catalyst to a treatment for removing the metal; and a third step involving subjecting the carbon catalyst that has been subjected to the treatment to a heat treatment to improve an activity of the carbon catalyst.

18 Claims, 7 Drawing Sheets

FIG.2
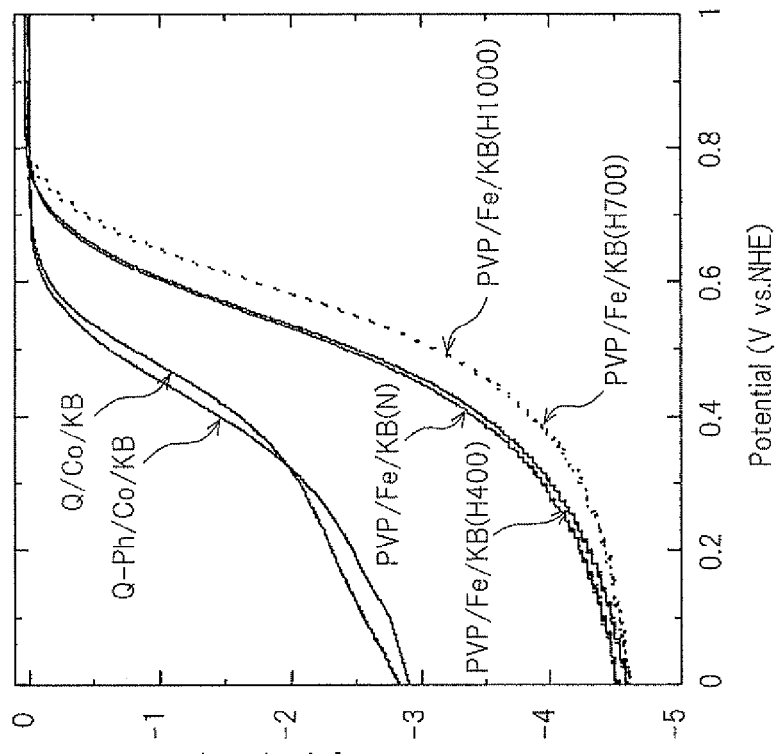
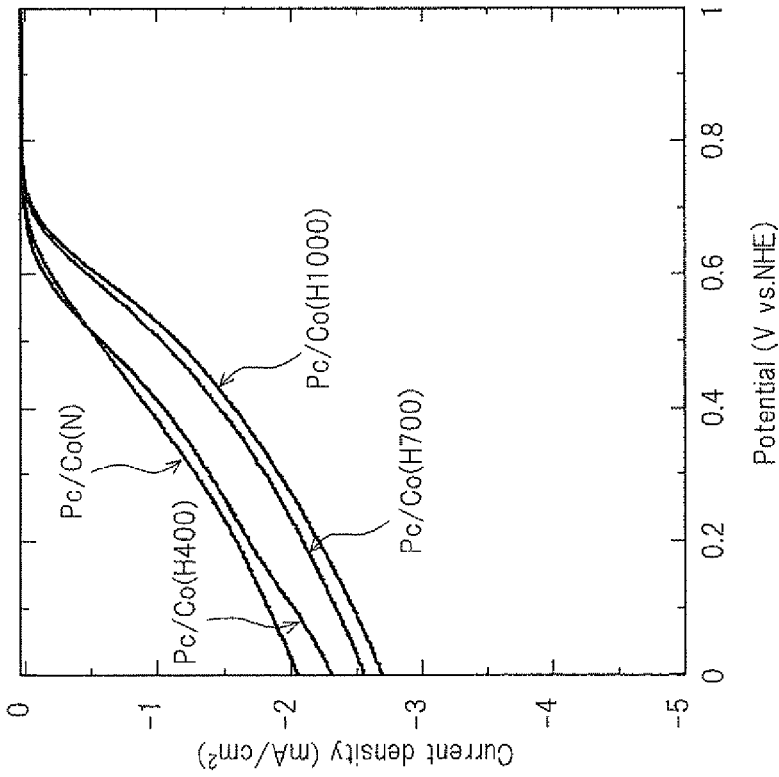

FIG.3

| CARBON CATALYST | CURRENT DENSITY (mA/cm$^2$) | OXYGEN REDUCTION-STARTING POTENTIAL (V) | NUMBER OF ELECTRONS INVOLVED IN REACTION |
|---|---|---|---|
| Pc/Co(N) | -0.0015 | 0.731 | 3.4 |
| Pc/Co(H400) | -0.0073 | 0.756 | 3.5 |
| Pc/Co(H700) | -0.0442 | 0.756 | 3.5 |
| Pc/Co(H1000) | -0.0625 | 0.763 | 3.5 |
| Q/Co/KB(N) | -0.0125 | 0.727 | 3.5 |
| Q-Ph/Co/KB | -0.0117 | 0.705 | 2.6 |
| PVP/Fe/KB(N) | -0.1814 | 0.775 | 3.9 |
| PVP/Fe/KB(H400) | -0.2075 | 0.765 | 3.9 |
| PVP/Fe/KB(H700) | -0.4678 | 0.795 | 3.9 |
| PVP/Fe/KB(H1000) | -0.4183 | 0.784 | 3.9 |
| PVP/Co/KB | -0.1230 | 0.784 | 3.8 |

FIG.4

| CARBON CATALYST | OXYGEN REDUCTION-STARTING POTENTIAL (V) | | NUMBER OF ELECTRONS INVOLVED IN REACTION | |
|---|---|---|---|---|
| | BEFORE HEAT TREATMENT | AFTER HEAT TREATMENT | BEFORE HEAT TREATMENT | AFTER HEAT TREATMENT |
| PVP/Fe/KB(C700) | 0.77 | 0.81 | 3.8 | 3.8 |
| PVP/Fe/KB(C800) | 0.79 | 0.81 | 3.8 | 3.8 |
| PVP/Fe/KB(C900) | 0.78 | 0.82 | 3.9 | 3.9 |
| PVP/Fe/KB(C1000) | 0.79 | 0.83 | 3.9 | 3.9 |

FIG.5

| CARBON CATALYST | CURRENT DENSITY (mA/cm$^2$) | OXYGEN REDUCTION-STARTING POTENTIAL (V) |
|---|---|---|
| Pc/Co(C800) | -0.0012 | 0.77 |
| Pc/Co(C1000) | -0.0015 | 0.75 |
| Pc/Fe(C800) | -0.0047 | 0.76 |

FIG.8
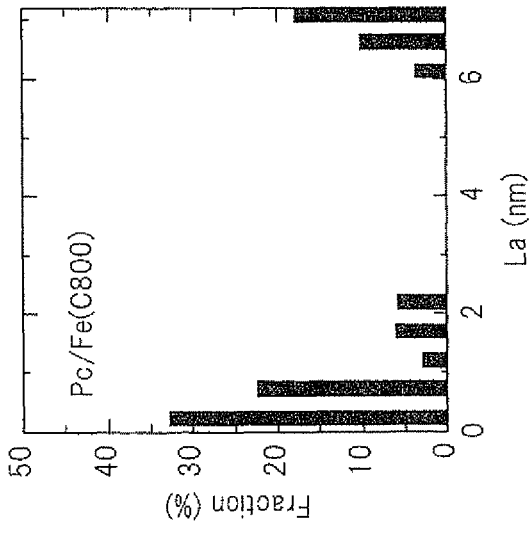
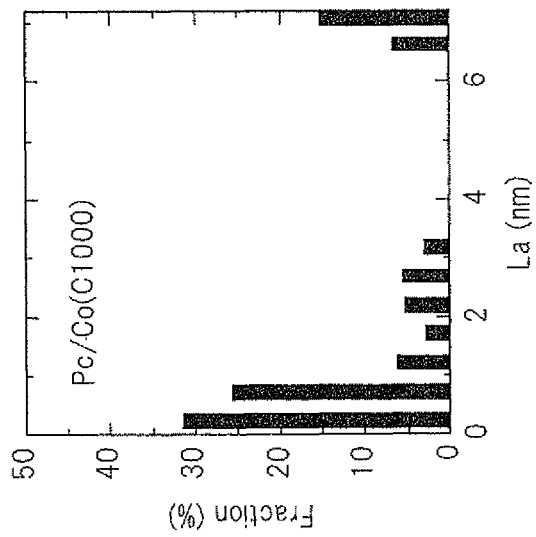
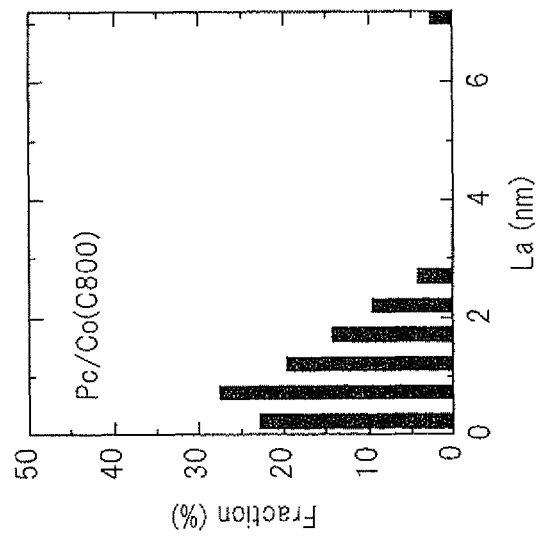

FIG.9

| CONDITION | SAMPLE | RATIO(%) | | | | | | |
|---|---|---|---|---|---|---|---|---|
| | | 1~5nm | LESS THAN 1nm | 2~5nm | LESS THAN 2nm | 3~5nm | LESS THAN 3nm | MORE THAN 5nm |
| PVP/Fe/KB (NO HEAT TREATMENT) | PVP/Fe/KB(C500-N) | 83 | 17 | 64 | 36 | 30 | 70 | 0 |
| | PVP/Fe/KB(C600-N) | 100 | 0 | 82 | 18 | 39 | 61 | 0 |
| | PVP/Fe/KB(C700-N) | 68 | 0 | 30 | 38 | 0 | 68 | 1 |
| | PVP/Fe/KB(C800-N) | 100 | 0 | 49 | 51 | 0 | 100 | 0 |
| | PVP/Fe/KB(C900-N) | 100 | 0 | 75 | 25 | 48 | 52 | 0 |
| | PVP/Fe/KB(C1000-N) | 100 | 0 | 78 | 22 | 19 | 81 | 0 |
| PVP/Fe/KB (AFTER HEAT TREATMENT) | PVP/Fe/KB(C700-H700) | 84 | 0 | 84 | 0 | 75 | 9 | 16 |
| | PVP/Fe/KB(C800-H700) | 100 | 0 | 100 | 0 | 81 | 19 | 0 |
| | PVP/Fe/KB(C900-H700) | 87 | 0 | 87 | 0 | 77 | 10 | 13 |
| | PVP/Fe/KB(C1000-H700) | 100 | 0 | 100 | 0 | 81 | 19 | 0 |
| Pc/Co | Pc/Co(C800) | 47 | 50 | 14 | 84 | 0 | 98 | 0 |
| | Pc/Co(C1000) | 22 | 57 | 13 | 65 | 3 | 76 | 22 |
| Pc/Fe | Pc/Fe(C800) | 14 | 55 | 6 | 63 | 0 | 69 | 31 |
| KB | KB | 35 | 0 | 35 | 0 | 24 | 11 | 65 |

CARBON CATALYST, METHOD FOR MANUFACTURING THE CARBON CATALYST, AND ELECTRODE AND BATTERY USING THE CARBON CATALYST

TECHNICAL FIELD

The present invention relates to a carbon catalyst and a method of manufacturing the carbon catalyst, and an electrode and a battery each using the carbon catalyst, in particular, a carbon catalyst that can replace a precious metal catalyst such as platinum or palladium.

BACKGROUND ART

A polymer electrolyte fuel cell (PEFC) can operate in a low-temperature region and has high energy conversion efficiency, and a time period required for its startup is short. In addition, the system of the PEFC can be made small and lightweight. Accordingly, the PEFC has been expected to find applications in power sources for electric vehicles, portable power sources, and household co-generation systems.

However, large amounts of platinum catalysts are used in the PEFC. The use of the platinum catalysts causes an increase in cost, which is one factor that may inhibit the widespread use of the PEFC. In addition, a concern has been raised in that restriction is imposed on the PEFC in terms of platinum reserves.

In view of the foregoing, the development of a novel catalyst that can replace the platinum catalyst has been advanced. That is, for example, a carbon catalyst obtained by imparting a catalytic activity to a carbon material itself has been proposed (see, for example, JP 2007-026746 A, JP 2007-207662 A and JP 2008-282725 A).

PRIOR ART DOCUMENT

Patent Document

Patent Document 1: JP 2007-026746 A
Patent Document 2: JP 2007-207662 A
Patent Document 3: JP 2008-282725 A

SUMMARY OF THE INVENTION

Problems to be Solved by the Invention

However, no catalyst having a high activity sufficient to replace the platinum catalyst in the PEFC has been put into practical use yet.

The present invention has been made in view of the above-mentioned problems, and an object of the present invention is to provide a carbon catalyst having an excellent activity and a method of manufacturing the carbon catalyst, and an electrode and a battery each using the carbon catalyst.

Means for Solving the Problems

A carbon catalyst according to one embodiment of the present invention for solving the above-mentioned problems is characterized by including a carbon structure, in which the carbon structure is formed of a carbon network plane in which, in a distribution of crystallite sizes La of 7.2 nm or less, a ratio of crystallite sizes of 1 to 5 nm is 10% or more, and a ratio of crystallite sizes in excess of 5 nm is 60% or less. According to the present invention, there can be provided a carbon catalyst having an excellent activity.

A carbon catalyst according to one embodiment of the present invention for solving the above-mentioned problems is characterized by including a carbon structure, in which the carbon structure is formed of a carbon network plane in which, in a distribution of crystallite sizes La of 7.2 nm or less, a ratio of crystallite sizes of 1 to 5 nm is 10% or more, and a ratio of crystallite sizes less than 1 nm is 70% or less. According to the present invention, there can be provided a carbon catalyst having an excellent activity.

Further, in the distribution of the crystallite sizes La, a ratio of crystallite sizes of 2 to 5 nm may be 80% or more, and a ratio of crystallite sizes of less than 2 nm may be 10% or less. In addition, in the distribution of the crystallite sizes La, a ratio of crystallite sizes of 3 to 5 nm may be 70% or more, and a ratio of crystallite sizes of less than 3 nm may be 20% or less. Thus, there can be more reliably provided a carbon catalyst having an excellent activity.

Further, the carbon structure may include a carbon structure formed by heating a raw material containing a resin and a metal to carbonize the resin. Thus, there can be reliably provided a carbon catalyst having an excellent activity.

An electrode according to one embodiment of the present invention for solving the above-mentioned problems is characterized by carrying any one of the above-mentioned carbon catalysts. According to the present invention, there can be provided an excellent electrode carrying a carbon catalyst having an excellent activity.

A battery according to one embodiment of the present invention for solving the above-mentioned problems is characterized by including the above-mentioned electrode. According to the present invention, there can be provided an excellent battery including an electrode carrying a carbon catalyst having an excellent activity.

A method of manufacturing a carbon catalyst according to one embodiment of the present invention for solving the above-mentioned problems is characterized by including: a first step involving heating a raw material containing a resin and a metal to carbonize the resin so that a carbon catalyst is obtained; a second step involving subjecting the carbon catalyst to a treatment for removing the metal; and a third step involving subjecting the carbon catalyst that has been subjected to the treatment to a heat treatment to improve an activity of the carbon catalyst. According to the present invention, there can be provided a method of manufacturing a carbon catalyst having an excellent activity.

Further, the heat treatment may be performed by heating the carbon catalyst at a temperature in a range of 300 to 1,500° C. Further, the heat treatment may be performed by heating the carbon catalyst at a temperature equal to or lower than a temperature at which the raw material is heated in the first step. Further, the carbon catalyst may be subjected to the treatment in the second step by washing the carbon catalyst with an acid. Further, the metal may include a transition metal. Thus, a carbon catalyst having an excellent activity can be more effectively manufactured.

A carbon catalyst according to one embodiment of the present invention for solving the above-mentioned problems is characterized by being manufactured by any one of the above-mentioned methods. According to the present invention, there can be provided a carbon catalyst having an excellent activity.

BRIEF DESCRIPTION OF THE DRAWINGS

FIG. 2 is an explanatory diagram illustrating a relationship between a voltage and a current measured for the carbon catalyst according to one embodiment of the present invention.

FIG. 3 is an explanatory diagram illustrating an example of the results of the evaluation of the carbon catalyst according to one embodiment of the present invention for its oxygen reduction activity.

FIG. 4 is an explanatory diagram illustrating another example of the results of the evaluation of the carbon catalyst according to one embodiment of the present invention for its oxygen reduction activity.

FIG. 5 is an explanatory diagram illustrating still another example of the results of the evaluation of the carbon catalyst according to one embodiment of the present invention for its oxygen reduction activity.

FIG. 8 is an explanatory diagram illustrating another example of the results of the analysis of the carbon catalyst according to one embodiment of the present invention for the distribution of the crystallite sizes La.

FIG. 9 is an explanatory diagram illustrating a ratio of each range of the crystallite sizes La in the distribution of the crystallite sizes La obtained for the carbon catalyst according to one embodiment of the present invention.

BEST MODE FOR CARRYING OUT THE INVENTION

Hereinafter, one embodiment of the present invention is described. It should be noted that the present invention is not limited to any example described in this embodiment.

Figure 1:
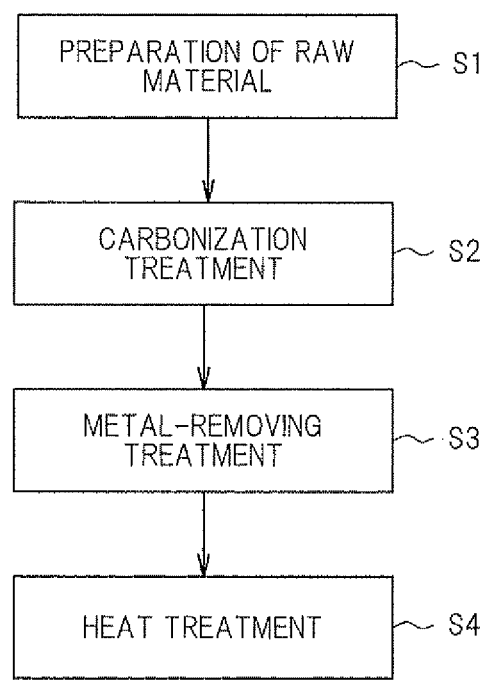
FIG. 1 is an explanatory diagram illustrating main steps in an example of a method of manufacturing a carbon catalyst according to one embodiment of the present invention.

FIG. 1 is an explanatory diagram illustrating main steps in an example of a method of manufacturing a carbon catalyst according to this embodiment (hereinafter referred to as "Manufacturing Method"). As illustrated in FIG. 1, the Manufacturing Method includes a raw material-preparing step S1, a carbonizing step S2, a metal-removing step S3, and a heat treatment step S4.

In the raw material-preparing step S1, a raw material containing a resin and a metal is prepared. The resin is not particularly limited as long as the resin is a polymer material that can be carbonized in the carbonizing step S2 to be described later. That is, for example, a thermosetting resin or thermoplastic resin that can be carbonized can be used. Specific examples which can be used include polyvinylpyridine polyacrylonitrile, a chelate resin, cellulose, carboxymethylcellulose, polyvinylalcohol, polyarylate, a polyfurfuryl alcohol, a furan resin, a phenol resin, a phenol-formaldehyde resin, polyimidazole, a mealmine resin, an epoxy resin, pitch, brown coal, polyvinylidene chloride, polycarbodiimide, lignin, anthracite, biomass, a protein, humic acid, polyimide, polyaniline, polypyrrole, nitrogen-containing ligand polymerized articles, and metallic ligand compounds. One kind of resin may be used alone, or two or more kinds thereof may be used in combination.

In addition, the resin can be a polymer ligand that can coordinate to the metal contained in the raw material. That is, in this case, a resin containing one or more ligand atoms in its molecule is used. Specifically, for example, there can be used a resin containing, as ligand atoms in its molecule, one or more of one kind, or two or more kinds, selected from the group consisting of a nitrogen atom, a phosphorous atom, an oxygen atom, and a sulfur atom. That is, for example, there can be used a resin containing, as ligand groups, in its molecule, one or more of one kind, or two or more kinds, selected from the group consisting of an amino group, a phosphino group, a carboxyl group, and a thiol group.

In addition, when the resin serving as a ligand is used, the raw material contains a complex formed as a result of the coordination of the resin to the metal. Therefore, the resin and the metal can be integrally and efficiently dispersed in the raw material.

Further, as the resin serving as a polymer ligand, a resin containing, as ligand atoms, one or more nitrogen atoms in its molecule can be preferably used. Specifically, for example, there can be preferably used one kind, or two or more kinds, selected from the group consisting of polyvinyl pyridine, a salen polymer, polypyrrole, polyvinyl pyrrole, 3-methyl polypyrrole, polyvinyl carbazole, polyamide, polyaniline, polybismaleimide, and polyamideimide.

In this case, the resin, the metal, and the nitrogen atoms can be integrally and efficiently dispersed in the raw material. In addition, the nitrogen atoms in the resin exert a nitrogen-doping effect in the carbon catalyst manufactured by the Manufacturing Method, and hence can improve the activity of the carbon catalyst.

In addition to such resin, a resin containing one or more nitrogen atoms in its molecule can also be preferably used. Specifically, for example, polyacrylonitrile (PAN), a urea resin oligomer, and a mealmine resin can be used. In this case, the resin and the nitrogen atoms can be integrally and efficiently dispersed in the raw material.

In addition, when a resin poor in thermosetting property is used, the resin may be made infusible. This operation allows the structure of the resin to be maintained even at a temperature equal to or higher than a melting point or softening point inherent in the resin. The resin can be made infusible by a known method.

The form of a mixture of the thermoplastic resin and the metal or the form of a metal complex of the thermoplastic resin is not particularly limited as long as the activity of the carbon catalyst manufactured by the Manufacturing Method is not impaired. Examples of the form include a sheet form, a fiber form, a block form, and a particle form.

The metal is not particularly limited as long as the activity of the carbon catalyst manufactured by the Manufacturing Method is not impaired. That is, for example, a transition metal can be preferably used as the metal, and a metal belonging to the fourth period of Groups 3 to 12 in the periodic table can be particularly preferably used as the metal.

One kind of those metals may be used alone, or two or more kinds thereof maybe used in combination. Specifically, for example, there can be preferably used one kind, or two or more kinds, selected from the group consisting of cobalt, iron, nickel, manganese, zinc, and copper. Of those, cobalt or iron can be particularly preferably used.

In addition, the metal can be used in the form of a simple substance of the metal or a compound of the metal. For example, a metal salt, a metal hydroxide, a metal oxide, a metal nitride, a metal sulfide, a metal carbide, or a metal complex can be preferably used as the metal compound, and a metal chloride, the metal oxide, or the metal complex can be particularly preferably used as the metal compound.

In addition, the raw material may contain a conductive carbon material for imparting conductivity to the carbon catalyst. A carbon material having conductivity can be used as the conductive carbon material without any particular limitation. That is, for example, a carbon material which has conductivity but has no catalytic activity by itself can be used. The shape of the conductive carbon material is not particularly limited, and for example, a particulate or fibrous material can be used.

When the fine particles of the conductive carbon material are used, the average particle diameter of the fine particles preferably falls within the range of 3 to 100 nm. In addition, the BET specific surface area of the fine particles preferably falls within the range of 100 to 2,000 $m^2/g$.

Specifically, for example, there can be preferably used, as the conductive carbon material, one kind, or two or more kinds, selected from the group consisting of carbon black, carbon nanotube, carbon nanofiber, graphite, activated carbon, glass-like carbon, carbon fiber, and fullerene. For example, Ketjen Black, Vulcan, Toka Black, or Denka Black can be used as carbon black.

In the raw material-preparing step S1, the raw material can be prepared by mixing such resin and metal as described above. That is, the raw material can be, for example, a mixed powder of the metal complex of the resin and the fine particles of the conductive carbon material. A method of mixing the contents of the raw material is not particularly limited. That is, one kind of mixing method such as powder mixing, solvent mixing, supercritical fluid mixing, and electrolytic polymerization coating may be employed alone, or two or more kinds thereof may be employed in combination.

When a conductive carbon material is used, for example, a content of the conductive carbon material in the raw material preferably falls within the range of 1 to 85 mass %, and more preferably falls within the range of 5 to 50 mass %. When the content of the conductive carbon material is less than 1 mass %, sufficient conductivity cannot be imparted to the carbon catalyst manufactured by the Manufacturing Method in some cases. In addition, when the content of the conductive carbon material exceeds 85 mass %, the activity of the carbon catalyst manufactured by the Manufacturing Method may reduce instead.

In the carbonizing step S2, the raw material prepared as described above is heated to carbonize the resin so that a carbon catalyst is obtained. That is, the raw material is held at such a predetermined temperature that the resin in the raw material can be carbonized (carbonization temperature).

The carbonization temperature is not particularly limited, and can be appropriately set depending on conditions such as the melting point and decomposition point of the resin. That is, for example, the carbonization temperature can be set to fall within the range of 300 to 1,500° C., can be preferably set to fall within the range of 500 to 1,200° C., can be more preferably set to fall within the range of 600 to 1, 200° C., and can be particularly preferably set to fall within the range of 700 to 1,200° C.

In addition, a rate of temperature increase can be set to fall within the range of 0.5 to 300° C./min. In addition, for example, the time period for which the raw material is held at the above-mentioned carbonization temperature can be set to fall within the range of 5 to 180 minutes, and can be preferably set to fall within the range of 20 to 120 minutes. When the holding time is less than 5 minutes, the resin cannot be uniformly carbonized in some cases. In addition, when the holding time exceeds 180 minutes, the catalytic activity may significantly reduce owing to the disappearance of an edge surface of a carbon network plane. In addition, the carbonization treatment is preferably performed in a stream of an inert gas such as nitrogen.

In the carbonizing step S2, a carbon catalyst having a carbon structure formed by the carbonization of the resin can be obtained. It should be noted that the carbon structure includes a carbon network plane formed as a result of two-dimensional binding and spread of the hexagonal network planes of carbon. A defective portion such as an edge portion or bent portion of the carbon network plane may serve as an active site of the carbon catalyst. The carbon structure can be a structure in which a plurality of carbon network planes are laminated.

The metal-removing step S3 involves subjecting the carbon catalyst obtained in the above-mentioned carbonizing step S2 to a treatment for removing the metal. The metal-removing treatment can remove the metal in the carbon catalyst or reduce the content of the metal in the carbon catalyst.

A method of removing the metal is not particularly limited. That is, for example, a washing treatment with an acid or an electrolytic treatment can be employed. When the washing with an acid is performed, boiling acid may be used. For example, hydrochloric acid can be preferably used as the acid.

The heat treatment step S4 involves subjecting the carbon catalyst that has been subjected to the metal-removing treatment in the above-mentioned metal-removing step S3 to a heat treatment to improve the activity of the carbon catalyst. The heat treatment is performed by holding the carbon catalyst at a predetermined temperature (heat treatment temperature). For example, the heat treatment temperature can be a temperature in the range of 300 to 1,500° C., and is set to preferably 400° C. or more, more preferably 600° C. or more, and particularly preferably 700° C. or more. Performing the heat treatment at 600° C. or more, or 700° C. or more can effectively improve the activity of the carbon catalyst. In addition, the heat treatment temperature is set to preferably 1,200° C. or less, more preferably 1,000° C. or less.

The range of the heat treatment temperature can be a range obtained by arbitrarily combining those lower and upper Limits. That is, for example, the heat treatment temperature can be set to fall within the range of 400 to 1,200° C., can be preferably set to fall within the range of 600 to 1,200° C., can be more preferably set to fall within the range of 700 to 1,200° C., and can be particularly preferably set to fall within the range of 700 to 1,000° C. In addition, for example, the time period for which the carbon catalyst is held at any such heat treatment temperature can be set to fall within the range of 10 minutes to 5 hours, and can be preferably set to fall within the range of 30 minutes to 2 hours. A rate of temperature increase can be set to fall within the range of, for example, 0.5 to 1,000° C./min.

As described above, the heat treatment is preferably performed at a temperature lower than a heating temperature generally adopted in the so-called graphitization treatment. That is, the heat treatment can be performed by, for example, heating the carbon catalyst at a heat treatment temperature equal to or lower than the temperature at which the raw material is heated in the carbonizing step S2 or at a heat treatment temperature lower than the temperature.

Specifically, for example, when the heating temperature in the carbonization treatment falls within the range of 600 to 1,200° C. or when the heating temperature falls within the range of 700 to 1,200° C., the heat treatment can be performed at a heat treatment temperature within the range and equal to or lower than the heating temperature or at a heat treatment temperature lower than the heating temperature.

Such heat treatment can result in effective formation of, for example, structural defects serving as active sites on the surface of the carbon catalyst. In addition, the heat treatment can remove, for example, an inert metal component remaining in a trace amount in the carbon catalyst after the metal-removing treatment. Therefore, a carbon catalyst having an additionally high activity as a result of effective exposure of the active sites can be obtained. As described above, according to the Manufacturing Method, a carbon catalyst excellent in catalytic activities such as an oxygen reduction activity can be manufactured.

In addition, the Manufacturing Method can include the step of introducing (doping) nitrogen atoms or boron atoms into the carbon catalyst. A method of introducing the nitrogen atoms or boron atoms into the carbon catalyst is not particularly limited. That is, when the carbon catalyst is doped with the nitrogen atoms, for example, a vapor phase doping method such as an ammo-oxidation method or a CVD method, a liquid phase doping method, or a vapor phase-liquid phase doping method can be employed.

Specifically, for example, in the vapor phase doping method, the nitrogen atoms can be introduced into the surface of the carbon catalyst by: mixing the carbon catalyst and a nitrogen source such as ammonia, melamine, or acetonitrile; and holding the mixture under an atmosphere of an inert gas such as nitrogen, argon, or helium and air at a temperature in the range of 550 to 1,200° C. for a time period in the range of 5 to 180 minutes or treating the mixture with heat in an NOx gas. As a result of the introduction of the nitrogen atoms, the nitrogen atoms can be introduced into, for example, the hexagonal network plane structures of the carbon structure to form pyrrole-type, graphene-substituted, pyridine-type, pyridone-type, or oxidized structures.

A carbon catalyst according to this embodiment (hereinafter referred to as "Catalyst") is a carbon catalyst manufactured by providing a carbon material itself with a catalytic activity, and can be efficiently manufactured by the Manufacturing Method described above.

The Catalyst is a carbon catalyst having a carbon structure including a carbon network plane. The carbon structure can be formed by, for example, heating a raw material containing a resin and a metal, to carbonize the resin as described above. In addition, the carbon structure is formed so as to include carbon network planes in which defective portions such as edge portions and bent portions are formed as active sites.

That is, for example, in the case where the Catalyst is manufactured by carbonizing a raw material containing a thermosetting resin and a metal (e.g., a raw material containing a metal complex of the thermosetting resin), the Catalyst can have a turbostratic structure (nanoshell structure) similar to a graphite structure laminated and developed like an onion around a fine particle of the metal. In this case, in the carbon catalyst, an edge portion of a carbon network plane in the turbostratic structure or a bent portion of the carbon network plane probably serves as an active site so that the catalytic activity of the carbon material itself may be educed.

In addition, for example, in the case where the Catalyst is manufactured by carbonizing a raw material containing a thermoplastic resin, a metal, and a conductive carbon material (e.g., a raw material containing a metal complex of the thermoplastic resin and the conductive carbon material), the Catalyst can have the conductive carbon material and a carbon structure that coats the surface of the conductive carbon material. In this case, the carbon structure is formed into a film shape along the surface of the conductive carbon material to serve as the coating of the conductive carbon material. That is, the Catalyst has a conductive carbon material portion as the so-called carrier (base material) and a carbon structure portion (carbonized layer) including active sites, the carbon structure portion being formed on the surface of the conductive carbon material. The carbon structure can be formed by heating the raw material in the process of the carbonization to coat the surface of the conductive carbon material with the molten thermoplastic resin, and to carbonize the thermoplastic resin on the surface of the conductive carbon material.

The Catalyst has, for example, an oxygen reduction activity as a catalytic activity. That is, the Catalyst can effectively catalyze, for example, an oxygen reduction reaction in an electrode for a fuel cell.

The Catalyst can be evaluated for its oxygen reduction activity in terms of, for example, an oxygen reduction-starting potential. That is, the oxygen reduction-starting potential of the Catalyst can be set to fall within the range of, for example, 0.7 V or more versus a normal hydrogen electrode (vs. NHE) and 1.2 V or less vs. NHE when the evaluation is performed by regarding the potential as the voltage at which a reduction current of $-10$ $\mu A/cm^2$ flows. In addition, for example, the oxygen reduction-starting potential can be set to 0.75 V or more, can be preferably set to 0.76 V or more, and can be more preferably set to 0.77 V or more.

It should be noted that the oxygen reduction-starting potential can be determined on the basis of, for example, data showing a relationship between the voltage and a current obtained by sweeping and applying a potential with a rotating ring-disk electrode apparatus having a working electrode wherein the Catalyst has been coated.

In addition, the Catalyst can be evaluated for its catalytic activity in terms of, for example, the number of electrons involved in an oxygen reduction reaction. In an oxygen reduction reaction catalyzed by the Catalyst, the number of electrons involved in the reaction is calculated as the number of electrons involved in the reduction reaction per molecule of oxygen.

That is, for example, in such a reaction where water is produced from protons and oxygen in the cathode electrode (air electrode) of a fuel cell, four electrons are theoretically involved in a reduction reaction for one molecule of oxygen. In actuality, however, a reaction in which hydrogen peroxide is produced as a result of the involvement of two electrons in a reduction reaction for one molecule of oxygen also occurs in parallel.

Therefore, it can be said that in the oxygen reduction reaction of the cathode electrode, the number of electrons involved in a reduction reaction for one molecule of oxygen is preferably as close to four as possible because an additionally large quantity of current can be obtained, the generation of hydrogen peroxide can be suppressed, and an environmental load can be reduced.

In this regard, according to the Catalyst, the number of electrons involved in the oxygen reduction reaction can be set to fall within the range of 3.5 to 4, can be preferably set to 3.6 or more, and can be more preferably set to 3.8 or more.

In addition, the Catalyst can have a characteristic distribution of crystallite sizes La of the carbon network planes of which its carbon structure is formed. It should be noted that the term "crystallite size La" refers to the spread of a carbon network plane in an a-axis direction.

That is, in the distribution of the crystallite sizes La of 7.2 nm or less of the carbon network planes of which the carbon structure of the Catalyst is formed, a ratio of crystallite sizes of 1 to 5 nm can be set to 10% or more, and a ratio of crystallite sizes in excess of 5 nm can be set to 60% or less. Further, the ratio of the crystallite sizes of 1 to 5 nm can be preferably set to 20% or more, can be more preferably set to 30% or more, and can be particularly preferably set to 40% or more. In addition, the ratio of the crystallite sizes in excess of 5 nm can be preferably set to 50% or less, and can be more preferably set to 40% or less. The ratio of the crystallite sizes of 1 to 5 nm and the ratio of the crystallite sizes in excess of 5 nm in the distribution of the crystallite sizes La can be obtained by arbitrarily combining the above-mentioned ranges.

Further, in the distribution of the crystallite sizes La of 7.2 nm or less of the carbon network planes of which the carbon structure of the Catalyst is formed, a ratio of crystallite sizes of 1 to 5 nm can be set to 10% or more, and a ratio of crystallite sizes less than 1 nm can be set to 70% or less. Further, the ratio of the crystallite sizes of 1 to 5 nm can be preferably set to 20% or more, can be more preferably set to 30% or more, and can be particularly preferably set to 40% or more. In addition, the ratio of the crystallite sizes less than 1 nm can be preferably set to 60% or less. The ratio of the crystallite sizes of 1 to 5 nm and the ratio of the crystallite sizes less than 1 nm in the distribution of the crystallite sizes La can be obtained by arbitrarily combining the above-mentioned ranges.

Such distribution of the crystallite sizes La can be determined by, for example, Diamond's method on the basis of the results of X-ray diffraction measurement. The Diamond's method is a method proposed by Diamond in 1956 for the evaluation of carbon network planes in a sample having a relatively small network plane size such as coal or pitch for their average size and distribution (see, for example, R. Diamond, Ph.D. Dissertation, University of Cambridge, England, 1956, R. Diamond, Acta. Cryst. 10 (1957) 359-363., R. Diamond, Acta. Cryst. 11 (1958) 129-138., and R. Diamond, Phil. Trans. Roy. Soc. London A252 (1960) 193-223.). Specifically, the method is a method of evaluating, under the assumption that a carbon sample whose structure is unknown is an aggregate of several kinds of model carbon network planes whose structures are known, the distribution of network plane sizes, the method involving: representing a measured eleven-band intensity in an X-ray diffraction profile obtained for the sample as the sum of the products of the theoretical X-ray scattering intensities of predetermined model network planes and weight fractions; and determining the respective weight fractions by the least-square method (see, for example, Hiroyuki FUJIMOTO, Carbon, 228 (2007) 185-194.).

An electrode according to this embodiment (hereinafter referred to as "Electrode") is an electrode that carries the Catalyst described above. That is, the Electrode can be formed so as to have a predetermined electrode base material and the Catalyst carried on the electrode base material.

The Electrode can be, for example, an electrode for a fuel cell. More specifically, the Electrode can be, for example, an electrode for a polymer electrolyte fuel cell (PEFC). That is, in this case, the Catalyst can be an electrode catalyst for a fuel cell, can be preferably an electrode catalyst for a PEFC, and can be particularly preferably a cathode electrode catalyst for a PEFC.

A battery according to this embodiment (hereinafter referred to as "Battery") is a battery having the above-mentioned Electrode. That is, for example, the Battery can be a fuel cell and can be preferably a PEFC as described above.

More specifically, for example, when the Battery is a PEFC, the Battery can have a membrane-electrode assembly (MEA) in which a polymer electrolyte membrane, and a cathode electrode (positive electrode, air electrode) and an anode electrode (negative electrode, fuel electrode) formed on one side, and the other side, of the polymer electrolyte membrane, are respectively integrated, and the cathode electrode can carry the Catalyst.

Next, specific examples according to this embodiment are described.

EXAMPLE 1

After 1.5 g of vinyl pyridine had been dissolved in 20 mL of dimethylformamide, polymerization was performed at 70° C. over 5 days. Thus, polyvinyl pyridine was obtained. 0.65 Gram of iron chloride hexahydrate was added to the polyvinyl pyridine, and then the mixture was stirred at room temperature for 24 hours. Thus, a polyvinyl pyridine iron complex was obtained.

Ketjen black (EC600JD, Lion Corporation) was added to the complex, and then the contents were mixed with a mortar. Thus, a raw material containing the polyvinyl pyridine iron complex and the ketjen black, and containing the ketjen black at 50 wt %, was obtained.

In addition, a raw material containing a cobalt complex of the polyvinyl pyridine and the ketjen black, and containing the ketjen black at 50 wt %, was obtained by using cobalt chloride hexahydrate instead of the above-mentioned iron chloride hexahydrate.

Next, those raw materials were each subjected to a carbonization treatment. That is, first, the raw materials prepared as described above were each loaded into a quartz tube. Next, the quartz tube was placed in an ellipsoidal reflection-type infrared gold image furnace, and then nitrogen purge was performed for 20 minutes.

Then, heating was started, and the temperature of the gold image furnace was increased from room temperature to 800° C. under a nitrogen atmosphere over 1.5 hours. After that, the quartz tube was held at 800° C. for 1 hour. A composition containing a carbon catalyst was obtained by such carbonization treatment.

Further, the composition thus obtained was pulverized with a planetary ball mill (P-7, Fritsch Japan Co, Ltd.) in which silicon nitride balls each having a diameter of 1.5 mm had been set at a rotational speed of 800 rpm for 60 minutes. The pulverized composition was taken out, and the fine particles of the carbon catalyst that had passed a sieve having an aperture of 105 µm were recovered.

Further, the carbon catalyst obtained as described above was subjected to an acid washing treatment for removing a metal. That is, 37% HCl was added to the carbon catalyst, and then the mixture was stirred for 2 hours. After that, the mixture was left at rest, and then the supernatant was decanted. The foregoing operation was performed three times. Further, suction filtration was performed, and then washing with distilled water was performed. Next, boiling was performed. Thus, two kinds of carbon catalysts (a PVP/Fe/KB catalyst and a PVP/Co/KB catalyst) each subjected to a metal-removing treatment were obtained.

In addition, part of the PVP/Fe/KB catalyst obtained as described above was subjected to a heat treatment. That is, the PVP/Fe/KB catalyst was loaded into a quartz tube, and then the quartz tube was placed in an ellipsoidal reflection-type infrared gold image furnace.

Then, the quartz tube was held in the infrared gold image furnace under a nitrogen atmosphere at 400° C., 700° C., or 1,000° C. for 1 hour. Thus, three kinds of carbon catalysts (a PVP/Fe/KB (H400) catalyst, a PVP/Fe/KB (H700) catalyst, and a PVP/Fe/KB (H1000) catalyst) subjected to heat treatments at three different temperatures were obtained.

EXAMPLE 2

10 Grams of 8-quinolinol (oxine), 10 g of formaldehyde, and 1 g of oxalic acid dihydrate were loaded into an eggplant flask having a volume of 100 mL, and then the mixture was refluxed at 100° C. overnight. Next, 5.5 mL of 1-M HCl were added to the resultant, and then the mixture was similarly refluxed overnight. The resultant solid was subjected to suction filtration, washed with distilled water three times, and dried in a vacuum overnight. Thus, a polymer (Q polymer) was obtained.

Meanwhile, 8-quinolinol and phenol were mixed at such a ratio that the molar fraction of phenol in a polymer to be obtained was 70%. The resultant mixture was loaded into a 100-mL eggplant flask in such an amount that the total amount of 8-quinolinol and phenol was 0.1 mol. Further, 0.1 mol of formaldehyde was added to the mixture, and then the contents were uniformly mixed while the eggplant flask was warmed with a hot water bath at 100° C. One gram of oxalic acid dihydrate was loaded into the eggplant flask, and then the whole was refluxed at 100° C. overnight. Further, 5.5 mL of 1-M HCl were added to the resultant, and then the mixture was similarly refluxed overnight. The resultant composition was subjected to suction filtration, washed with distilled water three times, and dried in a vacuum overnight. Thus, a polymer (Q-Ph polymer) was obtained.

3.3 Grams of each of the two kinds of polymers thus obtained were taken and dissolved in 100 mL of DMF. A solution prepared by dissolving 2.7 g of cobalt (II) chloride in 50 mL of DMF was added to the resultant solution, and then the mixed solution was left at rest overnight. The mixed solution was dried in a vacuum with an evaporator (90° C.) overnight. The resultant composition was washed in a Soxhlet extractor with ethanol for one day, and further, was dried in a vacuum overnight. Thus, two kinds of polymer cobalt complexes (a Q/Co complex and a Q-Ph/Co complex) were obtained.

Ketjen black (EC600JD, Lion Corporation) was added to each of the two kinds of polymer cobalt complexes thus obtained, and then the contents were mixed with a mortar. Thus, two kinds of raw materials each containing the Q/Co complex or the Q-Ph/Co complex, and the ketjen black, and containing the ketjen black at 50 wt % were obtained.

Each of the two kinds of raw materials thus prepared was heated with an infrared image furnace under a nitrogen atmosphere to 1,000° C. at a rate of temperature increase of 10° C./min, and was then carbonized by being held at 1,000° C. for 1 hour. The resultant composition was ground with a mortar, and then fine particles each having a particle diameter of 106 μm or less that had passed a sieve having an aperture of 106 μm were recovered as a carbon catalyst.

Further, the carbon catalyst obtained as described above was subjected to an acid washing treatment for removing cobalt. That is, 37% HCl was added to the carbon catalyst, and then the mixture was stirred for 2 hours. After that, the mixture was left at rest, and then the supernatant was decanted. The foregoing operation was performed three times. Further, after suction filtration was performed on the carbon catalyst, washing with distilled water was performed, and then boiling was performed. Thus, two kinds of carbon catalysts (a Q/Co/KB catalyst and a Q-Ph/Co/KB catalyst) each subjected to a metal-removing treatment were obtained.

EXAMPLE 3

3.275 Grams of a phenol resin (Gun Ei Chemical Industry Co., Ltd.) were added to 300 mL of acetone, and were then dissolved by being irradiated with an ultrasonic wave. Further, 1.0 g of a cobalt phthalocyanine complex (TOKYO CHEMICAL INDUSTRY CO., LTD.) was added to the solution, and then the solvent was removed with a rotary evaporator at 40° C. while an ultrasonic wave was applied. After that, the remaining composition was dried in a vacuum at a temperature of 80° C. for 24 hours. Thus, a cobalt phthalocyanine complex containing a phenol resin was synthesized.

The cobalt phthalocyanine complex thus prepared was loaded into a quartz tube, and then nitrogen gas purge was conducted on the quartz tube for 20 minutes in an ellipsoidal reflection-type infrared gold image furnace. Then, heating was started, and the temperature of the gold image furnace was increased from room temperature to 800° C. at a rate of temperature increase of 10° C./min. After that, the quartz tube was held at 800° C. for 1 hour. A carbon catalyst was obtained by such carbonization treatment.

Further, the carbon catalyst thus obtained was subjected to an acid washing treatment for removing cobalt. That is, 37% HCl was added to the carbon catalyst, and then the mixture was stirred for 2 hours. After that, the mixture was left at rest, and then the supernatant was decanted. The foregoing operation was performed three times. Further, after suction filtration was performed on the carbon catalyst, washing with distilled water was performed, and then boiling was performed. Thus, a carbon catalyst (a Pc/Co catalyst) subjected to a metal-removing treatment was obtained.

In addition, part of the Pc/Co catalyst thus obtained was subjected to a heat treatment. That is, the Pc/Co catalyst was loaded into a quartz tube, and then the quartz tube was placed in an ellipsoidal reflection-type infrared gold image furnace. Then, the quartz tube was held in the infrared gold image furnace under a nitrogen atmosphere at 400° C., 700° C., or 1,000° C. for 1 hour. Thus, three kinds of carbon catalysts (a Pc/Co (H400) catalyst, a Pc/Co (H700) catalyst, and a Pc/Co (H1000) catalyst) subjected to heat treatments at three different temperatures were obtained.

EXAMPLE 4

The five kinds of carbon catalysts obtained in Example 1, the two kinds of carbon catalysts obtained in Example 2, and the four kinds of carbon catalysts obtained in Example 3 were each evaluated for their oxygen reduction activity. That is, first, 5 mg of a powdery carbon catalyst were weighed, and then 50 μL of a binder solution (Nation (registered trademark), Du Pont Co., Ltd.), 150 μL of water, and 150 μL of ethanol were added in appropriate amounts to the carbon catalyst. The mixed solution was prepared as catalyst slurry.

Next, a trace amount of the catalyst slurry was sucked with a pipette, and was then coated on a disk electrode (having a diameter of 5 mm) of a rotating ring-disk electrode apparatus (RRDE-1 SC-5, Nikko Keisoku Co., Ltd.), followed by drying. Thus, a working electrode was manufactured. A platinum electrode was used as a ring electrode. A solution prepared by dissolving oxygen in a 1-M aqueous solution of sulfuric acid at normal temperature was used as an electrolyte solution.

The electrodes were rotated at a rotational speed of 1,500 rpm, and a current when a potential was swept at a sweep rate of 0.5 mV/sec was recorded as a function of the potential. In addition, the voltage at which a reduction current of −10 μA/cm² flowed in the resultant polarization curve was recorded as an oxygen reduction-starting potential. A current density when a voltage of 0.7 V was applied was also recorded. Further, the number n of electrons involved in a reaction was calculated from the following equation (I). In the equation (I), $I_D$ and $I_R$ represent a disk current and a ring current at a potential of 0 V, respectively, and N represents a capture ratio, which was set to 0.372256.

$$n = \frac{4I_D}{I_D + \frac{I_R}{N}} \quad (I)$$

FIG. 2 illustrates an example of a relationship between a voltage and a current density obtained by a rotating ring-disk electrode method. FIG. 2(A) illustrates the results for the four kinds of Pc/Co catalysts, and FIG. 2(B) illustrates the results for the four kinds of PVP/Fe/KB catalysts, the Q/Co/KB catalyst, and the Q-Ph/Co/KB catalyst. In FIG. 2, the axis of abscissa indicates a voltage (V vs. NHE) and the axis of ordinate indicates a current density (mA/cm$^2$) at each voltage. It should be noted that in FIG. 2, a carbon catalyst enabling the flow of a larger current at a higher voltage means that the catalyst has higher performance. In addition, FIG. 3 illustrates an example of the results of the evaluation of each of the carbon catalysts for its current density (mA/cm$^2$) when a voltage of 0.7 V was applied, oxygen reduction-starting potential (V), and number of electrons involved in a reaction.

As illustrated in FIGS. 2 and 3, the oxygen reduction activity of a carbon catalyst can be significantly improved by subjecting the carbon catalyst to a heat treatment. That is, for example, the Pc/Co (H400) subjected to the heat treatment at 400° C. provided a current density about five times as high as that of the Pc/Co (N) not subjected to any heat treatment. In addition, the Pc/Co (H700) subjected to the heat treatment at 700° C. provided a current density about 30 times as high as that of the Pc/Co (N) not subjected to any heat treatment. Further, the Pc/Co (H1000) subjected to the heat treatment at 1,000° C. provided a current density about 42 times as high as that of the Pc/Co (N) not subjected to any heat treatment.

That is, for example, the carbon catalysts each subjected to a heat treatment at 700° C. or 1,000° C. (PVP/Fe/KB (H700) and PVP/Fe/KB (H1000)) each showed an increase in current density by a factor of around 2.5 compared with that of the carbon catalyst not subjected to any heat treatment (PVP/Fe/KB (N)).

It was thought that performing such heat treatment was able to effectively burn off, for example, a functional group on the surface of a carbon catalyst, and as a result, a reaction field that could cause an oxygen reduction reaction was efficiently formed at an edge portion of a carbon network plane.

EXAMPLE 5

A raw material containing a polyvinyl pyridine iron complex and ketjen black, and containing the ketjen black at 50 wt %, was obtained in the same manner as in Example 1 described above. Then, in the same manner as in Example 1 described above, the temperature of the raw material was increased by heating, and then the raw material was held under a nitrogen atmosphere at 500° C., 600° C., 700° C., 800° C., 900° C., or 1,000° C. for 1 hour.

Further, in the same manner as in Example 1 described above, the compositions thus obtained were pulverized and sieved, followed by a metal-removing treatment. Thus, six kinds of carbon catalysts subjected to carbonization treatments at different temperatures (PVP/Fe/KB (C500), PVP/Fe/KB (C600), PVP/Fe/KB (C700), PVP/Fe/KB (C800), PVP/Fe/KB (C900), and PVP/Fe/KB (C1000)) were obtained.

In addition, in the same manner as in Example 1 described above, part of the four kinds of carbon catalysts manufactured at carbonization temperatures of 700° C. to 1,000° C. were each subjected to a heat treatment. A heating temperature in the heat treatment was set to 700° C. Then, each of the carbon catalysts was evaluated for its oxygen reduction activity in the same manner as in Example 4 described above.

FIG. 4 illustrates an example of the results of the evaluation of each of the four kinds of carbon catalysts, each of which was manufactured at a carbonization temperature of 700° C. to 1,000° C. but was not subjected to any heat treatment, and the four kinds of catalysts, each of which was manufactured at a carbonization temperature of 700° C. to 1,000° C. and subjected to a heat treatment for its oxygen reduction-starting potential (V) and number of electrons involved in a reaction. As illustrated in FIG. 4, subjecting a carbon catalyst to a heat treatment improved the oxygen reduction activity of the carbon catalyst.

EXAMPLE 6

Two kinds of carbon catalysts each carbonized at 800° C. or 1,000° C. (a Pc/Co (C800) catalyst and a Pc/Co (C1000) catalyst) were obtained in the same manner as in Example 3 described above. In addition, similarly, a carbon catalyst carbonized at 800° C. (Pc/Fe (C800) catalyst) was obtained by using an iron phthalocyanine complex instead of the cobalt phthalocyanine complex. Then, each of the carbon catalysts was evaluated for its oxygen reduction activity in the same manner as in Example 4 described above.

FIG. 5 illustrates an example of the results of the evaluation of each of the carbon catalysts for its current density (mA/cm$^2$) when a voltage of 0.7 V was applied and oxygen reduction-starting potential (V). As illustrated in FIG. 5, it was confirmed that each of the carbon catalysts had an oxygen reduction activity.

EXAMPLE 7

The eight kinds of carbon catalysts out of the carbon catalysts obtained in Example 5 described above, the ketjen black used in the manufacture of each of the carbon catalysts, and the three kinds of carbon catalysts obtained in Example 6, were each evaluated for the distribution of their crystallite sizes La.

A carbon catalyst sample was placed in a concave portion of a glass sample plate, and at the same time, was pressed with a slide glass. Thus, the sample was uniformly loaded into the concave portion so that its surface and a reference surface might coincide with each other. Next, the glass sample plate was fixed on a wide-angle X-ray diffraction sample base so that the morphology of the loaded carbon catalyst sample might not collapse.

Then, X-ray diffraction measurement was performed with an X-ray diffraction apparatus (Rigaku RINT2100/PC, Rigaku Corporation). A voltage and a current applied to an X-ray tube were set to 32 kV and 20 mA, respectively. A sampling interval, a scanning rate, and a measurement angle range (2θ) were set to 0.1°, 0.1°/min, and 5 to 100°, respectively. CuKα was used as an incident X-ray.

First, the powder X-ray diffraction pattern of each sample was measured. Then, a diffraction peak was measured, and integration was performed four times. Thus, data to be analyzed was obtained. Next, the average of the network plane sizes, and distribution of the sizes, of carbon were analyzed by employing Diamond's method. Analytical software (Carbon Analyzer D series, Hiroyuki FUJIMOTO, http://www.asahi-net.or.jp/~qn6h-fjmt/) installed in a computer was used in the analysis. The data to be analyzed was limited to the eleven-band intensity of a carbonaceous material measured with a CuKα ray as an X-ray source by using a counter graphite monochrometer. In addition, the maximum network plane size that could be analyzed was about 7 nm.

Here, the procedure of the analysis method proposed by Diamond is basically formed of the following six steps: (1) the measurement of the eleven-band intensity of a sample; (2) the correction of the measured intensity; (3) the assumption of model network planes expected to exist in the sample; (4) the calculation of theoretical scattering intensities from the assumed model network planes; (5) the least-square fitting of the determined measured intensity with the theoretical scattering intensities; and (6) the calculation of the weight fractions of the model network planes and an average network plane size from the weights of the respective theoretical scattering intensities. In view of the foregoing, first, the data to be analyzed was read, and was subjected to a smoothing treatment and absorption correction. The smoothing treatment was performed seven times, and the absorption correction was performed with a theoretical absorption coefficient of 4.219.

Next, the theoretical scattering intensities were calculated. The following equation (II) was used as a calculation equation. In the equation (II), I represents the measured intensity, w represents a mass fraction, B represents a theoretical X-ray scattering intensity, P represents a polarization factor, and v and s each represent a network plane model factor.

$$I_{OBS} = \sum_{i=1}^{n} w_i B_i(s) + B^{-CH2-}(s) + B^{-CH3}(s) + \\ B^{-NH2}(s) + B^{>C=O}(s) + B^{-O-}(s) + \sum P_r(s) + v(s) \quad \text{(II)}$$

Here, all parameters can each be represented as a function of n (see Hiroyuki FUJIMOTO, Carbon, 192 (2000) 125-129). The calculation of the theoretical scattering intensities requires the determination of a two-dimensional lattice constant $a_0$ and a Ruland coefficient, and the selection of the model network planes as the setting of initial conditions. The two-dimensional lattice constant is generally set to a value between the lattice constants of benzene and ideal graphite, i.e., about 0.240 to 0.24612 nm. The Ruland coefficient represents the integration width of a function showing the pass band of the energy of the monochrometer used, and generally takes a value of 0 to 1.

In this analysis, 0.24412 nm, a value close to the lattice constant of a general carbonaceous material, was selected as the initially set value of the lattice constant $a_0$, and 0.05 was selected as the initially set value of the Ruland coefficient.

Figure 6:
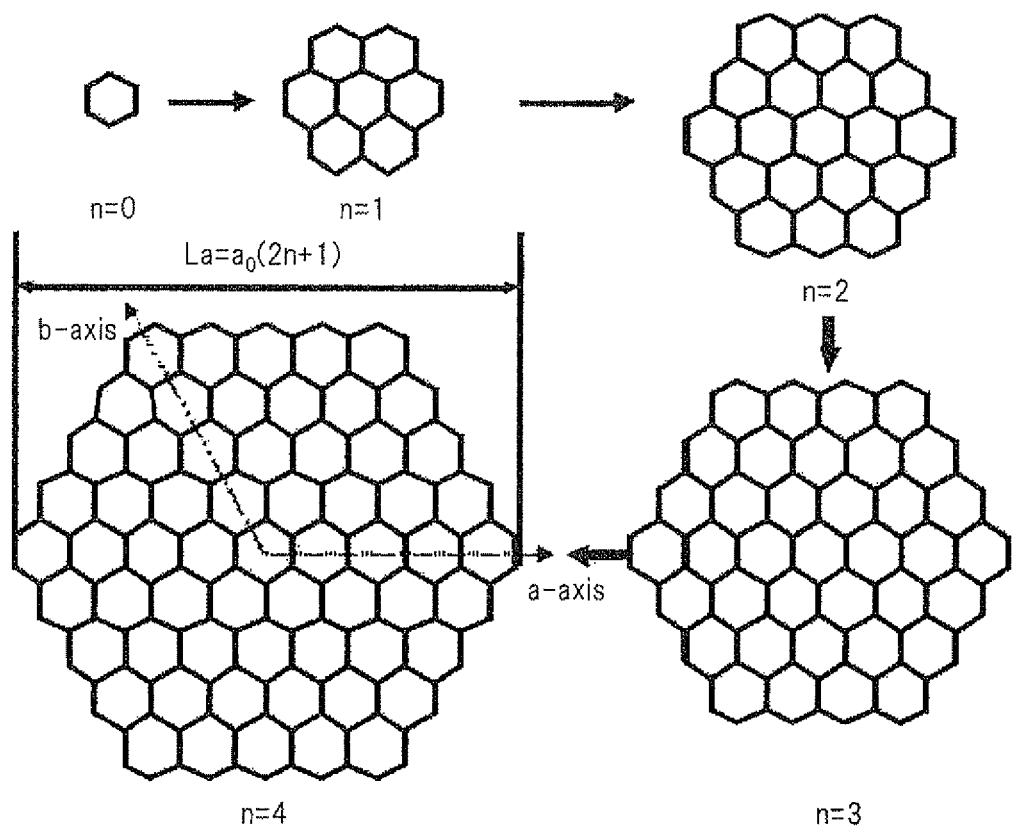
FIG. 6 is an explanatory diagram for a benzene-coronene base model used in the analysis of the carbon catalyst according to one embodiment of the present invention for the distribution of the crystallite sizes La.

Next, the model network planes were selected. The above-mentioned software can execute the calculation of a theoretical intensity with three kinds of model network planes, i.e., a benzene-coronene base model, a pyrene base model, and a mixed model. In contrast, a benzene-coronene base model such as illustrated in FIG. 6 was used in this analysis. In the case of the model, the scattering intensity of a model network plane having a size of an odd-number multiple (x1, 3, 5, . . . , 25, 27, or 29) of the two-dimensional lattice constant $a_0$ (that is, the size is about 0.25 nm to 7 nm) can be calculated.

Thus, all selection conditions were determined, and then the theoretical scattering intensities were calculated. After the completion of the calculation, repeated calculation according to the least-square method based on the following equation (III) was performed 1,000 times. Then, a measured profile and a theoretical profile were fitted with each other with a fitting angle range 2θ set to 60 to 100°. After the completion of the fitting, the display of the computer displayed a fitting result, a network plane size distribution, and an average network plane size. Thus, the ratios (%) of crystallite sizes of 0.245 nm, 0.736 nm, 1.223 nm, 1.719 nm, 2.210 nm, 2.700 nm, 3.200 nm, 3.683 nm, 4.174 nm, 4.665 nm, 5.156 nm, 5.647 nm, 6.138 nm, 6.630 nm, and 7.110 nm were obtained as the distribution of the crystallite sizes La of 7.2 nm or less.

$$|R = \frac{\sum_{S} \left| I_{OS} - \sum_{i} \lambda_i B_{is} \right|}{\sum_{S} I_{OS}} \times 100 \quad \text{(III)}$$

Figure 7:
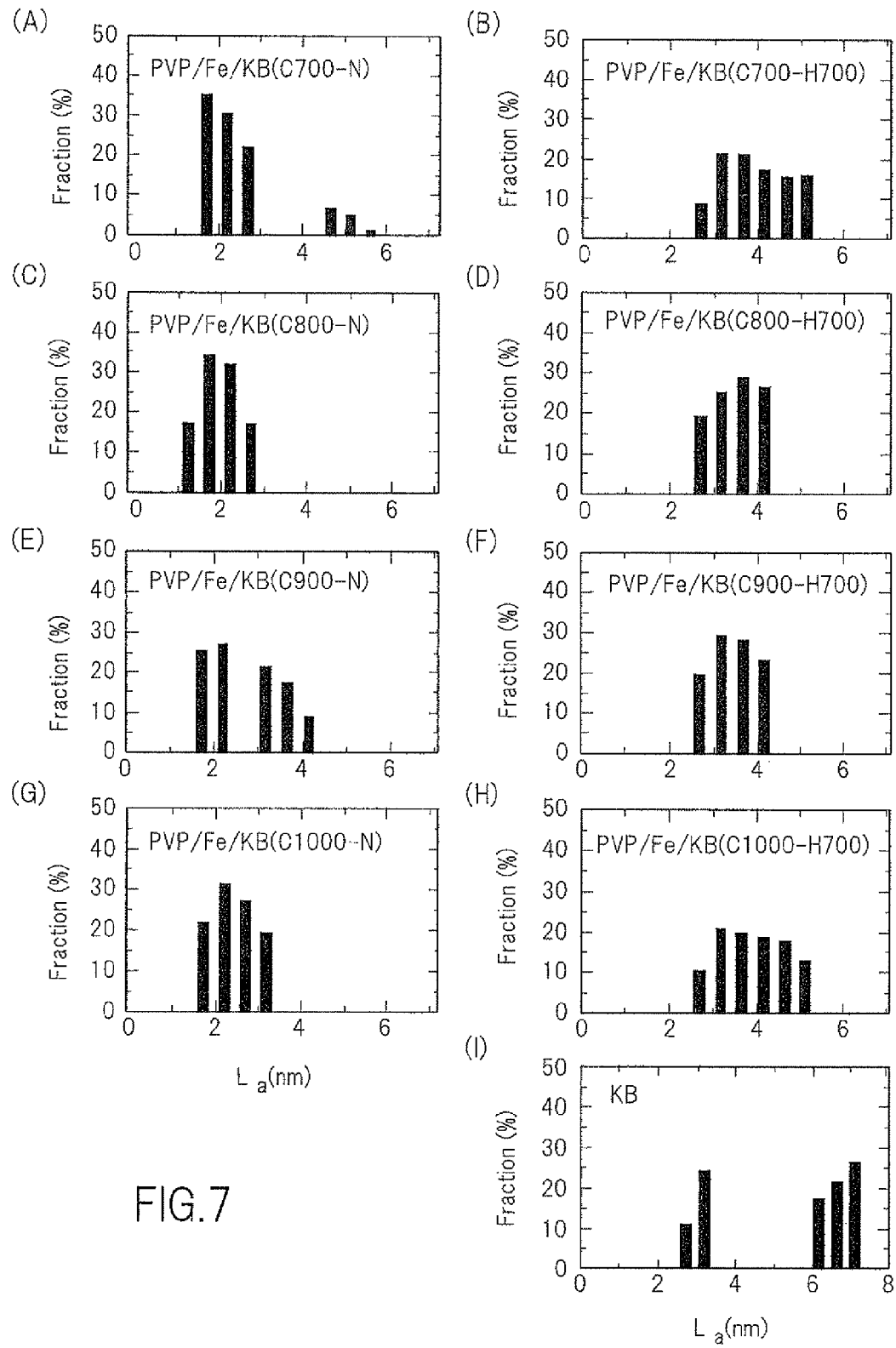
FIG. 7 is an explanatory diagram illustrating an example of the results of the analysis of the carbon catalyst according to one embodiment of the present invention for the distribution of the crystallite sizes La.

FIG. 7 illustrates an example of the distribution of the crystallite sizes La obtained for each of the eight kinds of carbon catalysts manufactured at carbonization temperatures of 700 to 1,000° C. in Example 5 described above and the ketjen black used in the manufacture of each of the carbon catalysts. FIGS. 7(A), 7(C), 7(E), and 7(G) illustrate the results of the carbon catalysts which were manufactured at carbonization temperatures of 700° C., 800° C., 900° C., and 1,000° C. but were not subjected to any heat treatment, respectively. FIGS. 7(B), 7(D), 7(F), and 7(H) illustrate the results of the carbon catalysts which were manufactured at carbonization temperatures of 700° C., 800° C., 900° C., and 1,000° C. and subjected to a heat treatment at 700° C., respectively. FIG. 7(I) represents the results of the ketjen black.

In addition, FIG. 8 illustrates an example of the distribution of the crystallite sizes La obtained for each of the three kinds of carbon catalysts obtained in Example 6 described above. FIGS. 8(A), 8(B), and 8(C) illustrate the results of the Pc/Co (C800) catalyst, the Pc/Co (C1000) catalyst, and the Pc/Fe (C800) catalyst not subjected to any heat treatment, respectively. In addition, FIG. 9 illustrates the ratio (%) of the crystallite sizes La in each range in the distribution of the crystallite sizes La obtained for each of the thirteen kinds of carbon catalysts and the ketjen black serving as the objects of the analysis.

As illustrated in FIGS. 7 to 9, of the ten kinds of carbon catalysts (PVP/Fe/KB) manufactured by using raw materials each containing the polyvinyl pyridine, iron, and the ketjen black, the carbon catalysts subjected to the heat treatment each had a distribution of the crystallite sizes La different from that of the carbon catalyst not subjected to any heat treatment.

That is, for example, the PVP/Fe/KB catalysts subjected to the heat treatment each had such a specific distribution of the crystallite sizes La that the ratio of the crystallite sizes La in the range of 2 to 5 nm was as high as 80 to 100% and the ratio of the crystallite sizes of less than 2 nm was as low as 10% or less. Further, the PVP/Fe/KB catalysts subjected to the heat treatment each had such a specific distribution of the crystallite sizes La that the ratio of the crystallite sizes La in the range of 3 to 5 nm was as high as 70% or more and the ratio of the crystallite sizes of less than 3 nm was as low as 20% or less.

Such change of the distribution of the crystallite sizes La of a carbon catalyst depending on the presence or absence of a heat treatment was considered to be related to such improvement in oxygen reduction activity brought about by the heat treatment as illustrated in FIG. 3 of Example 4 described above.

The invention claimed is:

1. A carbon catalyst comprising:
 a carbon structure; and
 a fine metal particle, wherein:
  the carbon structure is formed of a carbon network plane in which, in a distribution of crystallite sizes La of 7.2 nm or less, a ratio of crystallite sizes of 1 to 5 nm is 10% or more, a ratio of crystallite sizes in excess of 5 nm is 60% or less, a ratio of crystallite sizes of 2 to 5 nm is 80% or more, and a ratio of crystallite sizes of less than 2 nm is 10% or less; and
  the carbon catalyst has a turbostratic structure including a layered laminated structure like an onion around the fine metal particle.

2. The carbon catalyst according to claim 1, wherein, in the distribution of the crystallite sizes La, a ratio of crystallite sizes of 3 to 5 nm is 70% or more, and a ratio of crystallite sizes of less than 3 nm is 20% or less.

3. The carbon catalyst according to claim 1, wherein the carbon structure comprises a carbon structure formed by heating a raw material containing a resin and a metal to carbonize the resin.

4. An electrode that carries the carbon catalyst according to claim 1.

5. A battery comprising the electrode according to claim 4.

6. A carbon catalyst comprising:
 a carbon structure; and
 a fine metal particle, wherein:
  the carbon structure is formed of a carbon network plane in which, in a distribution of crystallite sizes La of 7.2 nm or less, a ratio of crystallite sizes of 1 to 5 nm is 10% or more, a ratio of crystallite sizes less than 1 nm is 70% or less, a ratio of crystallite sizes of 2 to 5 nm is 80% or more, and a ratio of crystallite sizes of less than 2 nm is 10% or less; and
  the carbon catalyst has a turbostratic structure including a layered laminated structure like an onion around the fine metal particle.

7. The carbon catalyst according to claim 6, wherein, in the distribution of the crystallite sizes La, a ratio of crystallite sizes of 3 to 5 nm is 70% or more, and a ratio of crystallite sizes of less than 3 nm is 20% or less.

8. The carbon catalyst according to claim 6, wherein the carbon structure comprises a carbon structure formed by heating a raw material containing a resin and a metal to carbonize the resin.

9. An electrode that carries the carbon catalyst according to claim 6.

10. A battery comprising the electrode according to claim 9.

11. A carbon catalyst comprising:
 a carbon structure; and
 a fine metal particle, wherein:
  the carbon structure is formed of a carbon network plane in which, in a distribution of crystallite sizes La of 7.2 nm or less, a ratio of crystallite sizes of 1 to 5 nm is 10% or more, a ratio of crystallite sizes in excess of 5 nm is 60% or less, a ratio of crystallite sizes of 3 to 5 nm is 70% or more, and a ratio of crystallite sizes of less than 3 nm is 20% or less; and
  the carbon catalyst has a turbostratic structure including a layered laminated structure like an onion around the fine metal particle.

12. The carbon catalyst according to claim 11, wherein the carbon structure comprises a carbon structure formed by heating a raw material containing a resin and a metal to carbonize the resin.

13. An electrode that carries the carbon catalyst according to claim 11.

14. A battery comprising the electrode according to claim 13.

15. A carbon catalyst comprising:
 a carbon structure; and
 a fine metal particle, wherein:
  the carbon structure is formed of a carbon network plane in which, in a distribution of crystallite sizes La of 7.2 rim or less, a ratio of crystallite sizes of 1 to 5 rim is 10% or more, a ratio of crystallite sizes less than 1 nm is 70% or less, a ratio of crystallite sizes of 3 to 5 nm is 70% or more, and a ratio of crystallite sizes of less than 3 nm is 20% or less; and
  the carbon catalyst has a turbostratic structure including a layered laminated structure like an onion around the fine metal particle.

16. The carbon catalyst according to claim 15, wherein the carbon structure comprises a carbon structure formed by heating a raw material containing a resin and a metal to carbonize the resin.

17. An electrode that carries the carbon catalyst according to claim 15.

18. A battery comprising the electrode according to claim 17.

* * * * *